Oct. 16, 1945.  E. W. MILLER  2,387,167
GENERATIVE GEAR GRINDING MACHINE WITH FEED CONTROLLING SLIDE
Filed Dec. 23, 1943  3 Sheets-Sheet 1
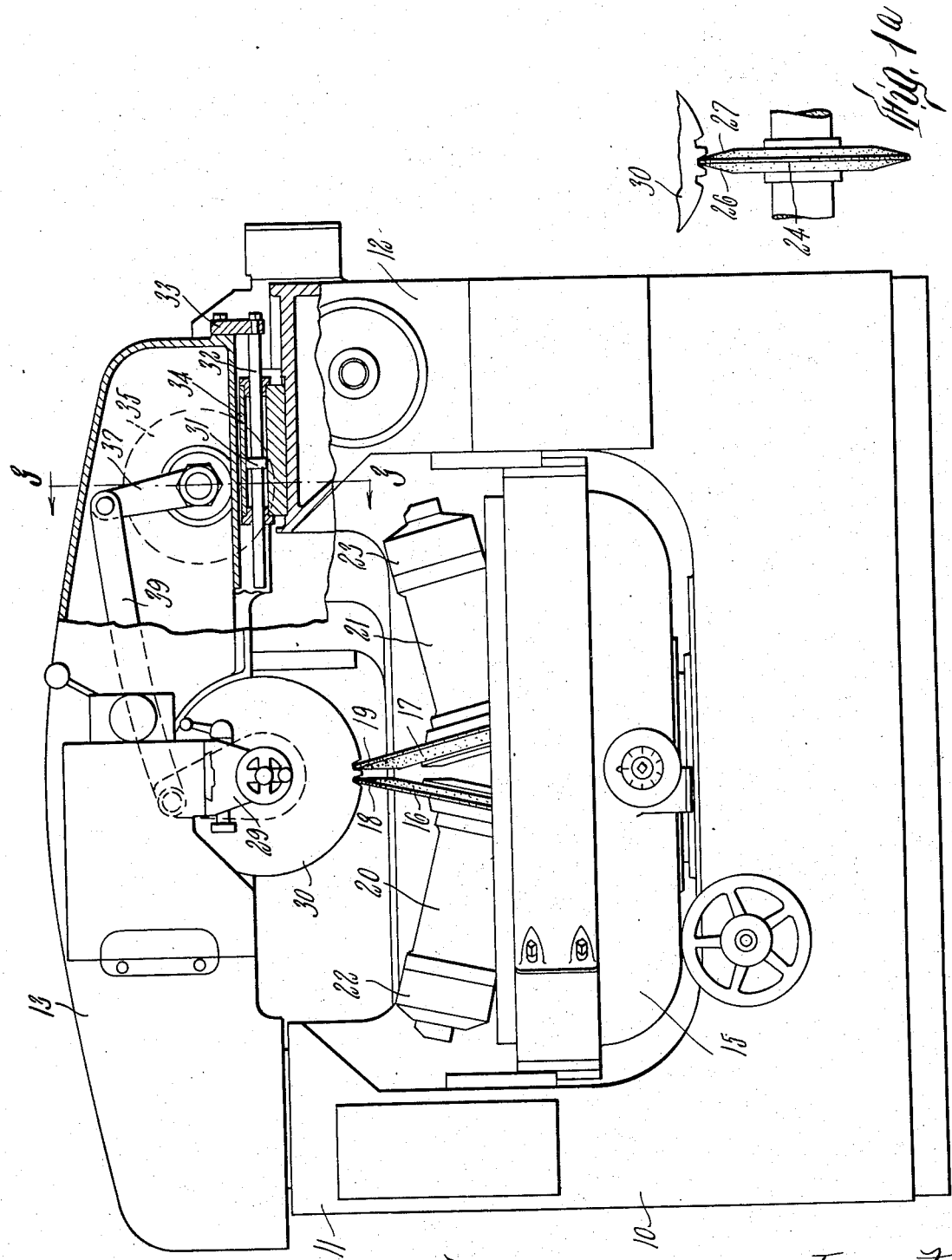
Inventor
Edward W. Miller

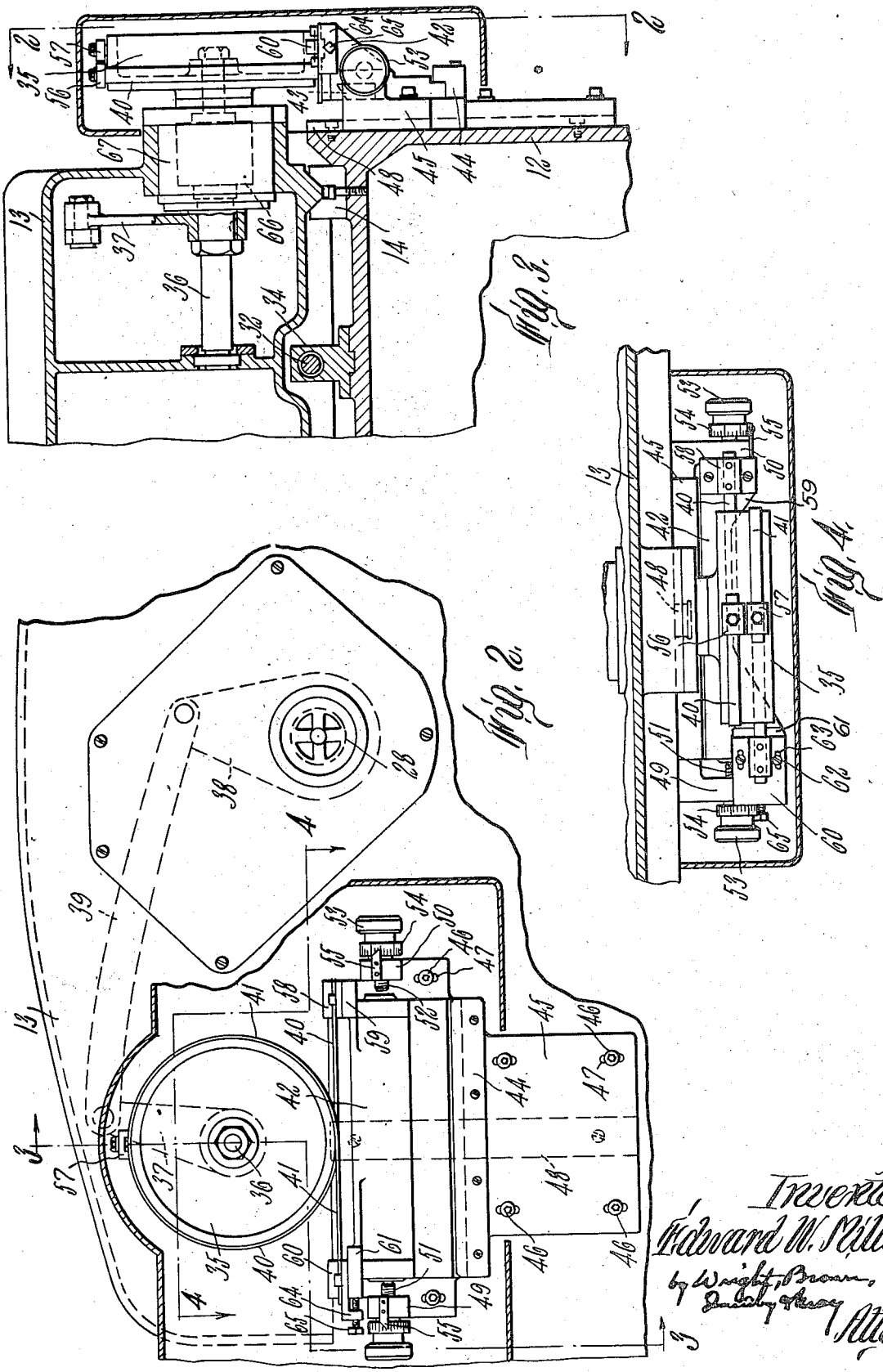

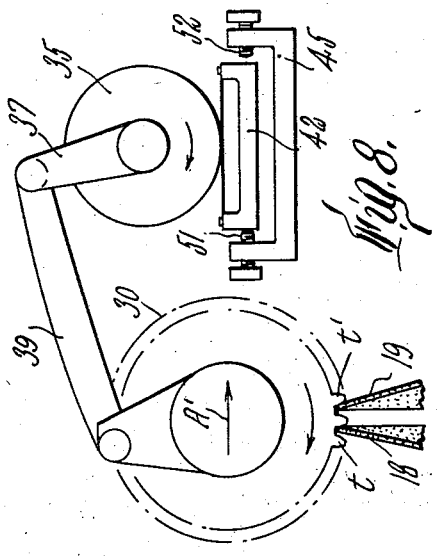
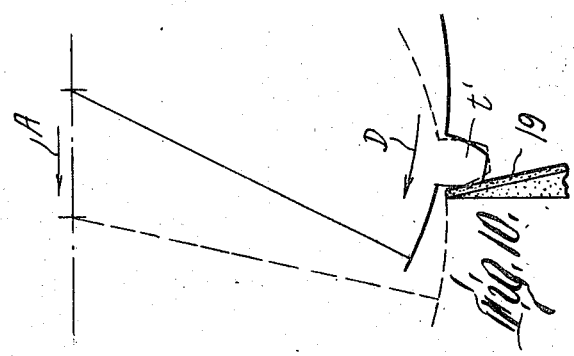
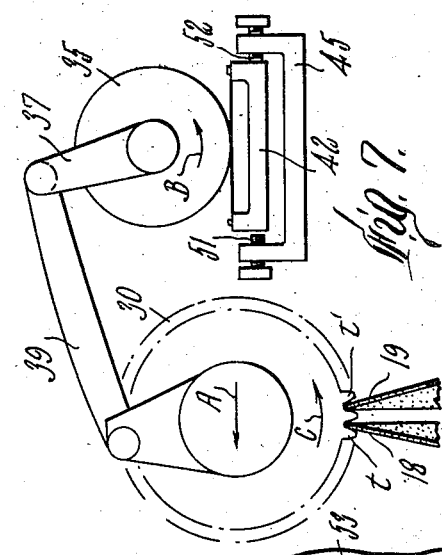
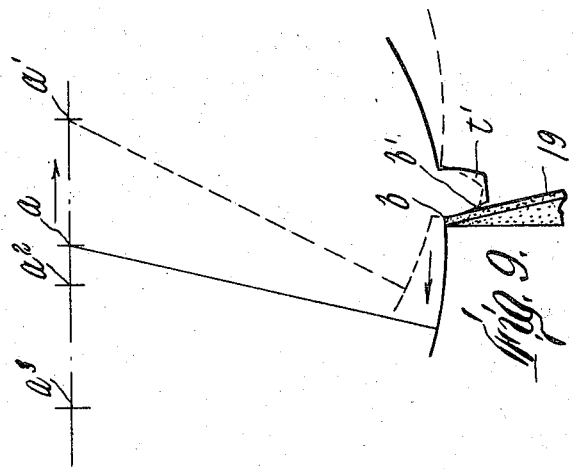
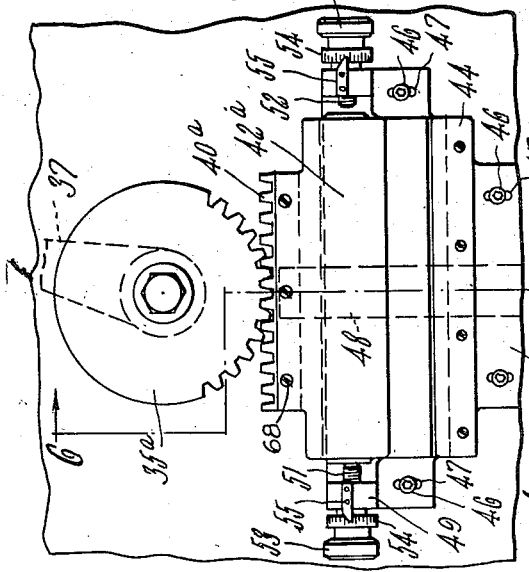
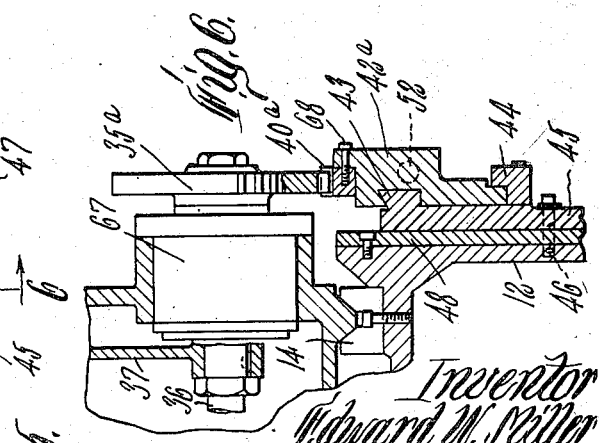

Patented Oct. 16, 1945

2,387,167

UNITED STATES PATENT OFFICE 2,387,167

GENERATIVE GEAR GRINDING MACHINE WITH FEED CONTROLLING SLIDE

Edward W. Miller, Springfield, Vt., assignor to The Fellows Gear Shaper Company, Springfield, Vt., a corporation of Vermont Application December 23, 1943, Serial No. 515,360

12 Claims. (Cl. 51—123)

The present invention relates to machines for grinding gears, gear shaper cutters, and other articles having curved surfaces, so as to generate a prescribed form or contour on the surface of the work by relative movement between a workpiece and a grinding wheel, or pair of grinding wheels, or equivalent cutting tool, of which the cutting points lie in a surface of revolution, the profile of which is conjugate to the form to be generated. More particularly it relates to means for controlling the generative relative movement which is caused to take place between the workpiece and tool, and to means whereby a plurality of successive cutting steps may be performed with provisions for regulating the depth of cutting at each step.

The embodiment of the invention shown herein is applied to a machine of the character disclosed in my pending application Serial No. 408,-766, filed August 29, 1941, entitled "Automatic gear grinding machine"; and it differs from said disclosure in the provision of means including a reciprocable slide for controlling the rotational component of the movement of the work piece in correlation with provisions for effecting a feeding step between successive cuts and for determining the direction in which cutting action proceeds along the surface being ground. The new steps of the invention are not limited to combination with only the specific machine illustrated in said application but are applicable in other combinations.

In general, the invention comprises a means for effecting a relative rolling movement between the workpiece and cutting tool, compounded of rotation about an axis and relative translation between such axis and the tool. More specifically it includes a slide which is coupled with the workpiece and with motive means and cooperates with adjustable abutments to control the rotative component of such rolling motion and to perform feeding steps in cooperation with adjustments of the abutments or either of them.

A further description of the principles of the invention, the objects sought, and the results accomplished by it, is given in the following specification in connection with illustrative drawings. In the drawings, Figure 1 is a front elevation, partly broken away and shown in section, of a gear grinding machine like that shown in my before-named application, but modified by the substitution of a slide and operative connections between such slide and the work carrier for controlling the movements of the work carrier.

Figure 1a is a fragmentary view showing an alternative form of grinding wheel.

Figure 2 is a rear elevation of so much of the machine as contains the slide, the connections between the same and the work holder, and other cooperative parts; a protective housing being shown in section as taken on line 2—2 of Figure 3.

Figure 3 is a cross section taken on line 3—3 of Figures 1 and 2.

Figure 4 is a horizontal section taken on the line 4—4 of Figure 2.

Figure 5 is a view similar to Figure 2 showing an alternative equivalent means of connection between the rotation-controlling slide and the work holder.

Figure 6 is a cross section taken on line 6—6 of Figure 5.

Figures 7, 8, 9 and 10 are diagrams illustrating some of the effects and results obtainable by means of the motion-controlling means here shown.

Like reference characters designate the same parts wherever they occur in all of the figures.

In the following description it will be assumed that the workpiece shown in the drawings is an involute spur gear, in the understanding that this assumption shall not be construed as limiting the invention to less than the scope defined by the appended claims with reference to the prior art.

The machine structure comprises a base 10 from which separated standards 11 and 12 rise. These standards support a work carriage 13 which bridges across the intermediate space and is engaged with both standards by means of suitable guideways, one of which is shown at 14 in Figure 3. The guideways are arranged to permit reciprocating movement of the carriage 13 in the direction of its length, or in other words in a path which extends from one standard to the other.

In the space framed by the base, the standards, and the carriage, is a tool support 15 on which cutting tools are mounted. Figure 1 shows tools in the form of two grinding wheels 16 and 17 having active faces 18 and 19, respectively, lying and rotating in planes at an angle to each other equal to the angle between the side faces of a selected rack tooth. These grinding wheels are secured to spindles which rotate in the housings 20 and 21 respectively and are driven by independent motors 22 and 23. The manner and means of mounting and driving the grinding wheels may be the same as described in my before-named application. For some purposes either wheel 16 or 17 may be employed without the other. Alternatively a grinding wheel such as that shown at 24 in Figure 1a and having conical faces 26 and 27 at opposite sides next to the margin or rim may be used in substitution for the two wheels 16 and 17. The faces 18 and 19 of the two wheels are adapted to act on the relatively opposite faces of two teeth of the work gear; and so are the conical faces or zones 26 and 27 of the wheel 24.

The carriage 13 supports a rotatable work spindle 28 (shown in dotted lines in Figure 2), and a tailstock 29, between which a gear 30, or other workpiece to be ground, is mounted in axial alinement with the spindle; such workpiece being suitably coupled with the spindle to be rotated simultaneously therewith. The spindle is disposed above the upper rims of the grinding wheels with its axis transverse to the directions of reciprocation of the carriage, and the tool support 15 is adjustable vertically. Thus the grinding wheels may brought into operative relation with gears of different diameters.

The carriage 13 is reciprocated to move the work back and forth across the grinding wheels by means of a piston 31 on a piston rod 32 which is connected at one end to the carriage by a bracket 33. Rod 32 is parallel to the movement of the carriage and passes through a cylinder 34 mounted on the standard 12, in which the piston 31 fits slidingly. Working fluid admitted alternately to opposite ends of the cylinder imparts the prescribed movements to the carriage.

One embodiment of means for imparting the rotative component of movement to the work spindle, and controlling such component, is shown in Figures 2, 3 and 4. A wheel or roll 35 is operatively connected with the work spindle 28 by a shaft 36 to which it is fastened, said shaft being parallel to the axis of the work spindle 28 and work piece, an arm 37 secured to the shaft, an arm 38 connected with the work spindle 28, and a link 39 connecting the arms 37 and 38. The wheel or roll is also coupled by means of inextensible flexible tapes 40 and 41 with a slide 42, which is movable horizontally in a path parallel to the path of carriage 13 on ways 43 and 44 on a bracket or slide support 45 which is secured to the rear side of the standard 12 with provisions for adjustment vertically so as to locate the slide 42 in positions more or less distant from the axis of shaft 36.

The support 45 is secured to the machine structure by bolts 46 passing through elongated slots 47, and is guided by a vertical guide rib 48 secured to the outer face of the standard and contained in a guideway in the inner face of the support. Forwardly projecting lugs 49 and 50 at opposite sides of the upper end of the support 45 contain screws 51 and 52 in alinement with, and adjacent to, opposite ends of the slide 42. These screws may be advanced far enough to engage the slide simultaneously to prevent any movement thereof, and may be retracted to various distances to permit movement of the slide through limited distances of different magnitudes. Each screw carries a head 53 by which it may be rotated and a graduated disk or collar 54 cooperating with a stationary index 55 to measure the adjustments of the screw.

The tapes 40 and 41 are secured by clamps 56 and 57 to the circumference of the wheel 35 at points which are at the upper side of the wheel when the carriage is at or near the middle of its stroke. They pass from the clamps in opposite directions around the circumference of the wheel to connection with the ends of the slide 42; the tape 40 being secured at its outer end to a clamp 58 which is secured to a bracket 59 on one end of the slide, and tape 41 being secured to a clamp 60 which is bolted to a bracket 61 on the opposite end of the slide with provisions for adjustment. Bolts 62 which secure clamp 60 pass through elongated holes 63 in the clamp, extending in the direction of the tape. A lug 64 on clamp 60 overhangs bracket 61 and carries a setscrew 65 bearing against the bracket for adjustment to take up looseness in the tapes and hold them taut.

The tapes and wheel 35 rest on a plane surface of the slide 42 which is parallel to the path of carriage 13. Thus, as the carriage 13 travels, the wheel rolls on the slide without slip. Angular movement is transmitted from the wheel 35 to the work spindle through the linkage 37, 38, 39 previously described, and an indexing means between the arm 38 and the spindle 28. The arms 37 and 38 are equal length between their axes and the central points of their attachment to the link, and such points of attachment are spaced apart a center distance equal to that between the axes of shaft 36 and spindle 28. This linkage thus transmits equal angular movement from the wheel to the spindle.

The coaction of slide 42 with the abutments 51 and 52 enables increments of angular feed movement to be imparted to the work so that the generated surfaces may be brought to final form, and location with respect to other surfaces, in a succession of cuts. It also enables the direction of cutting progress on such a surface to extend in the direction from the crest toward the root of the surface or in the opposite direction, i. e. from root to crest or tip.

Shaft 36 is connected with reversible torque-applying means arranged and operating to exert rotative force on the shaft in opposite directions in time with the travel of the carriage 13 in opposite directions. Such torque-applying means is diagrammatically indicated in Figure 3 as a hydraulic motor of the well known paddle type, the rotor 66 of which is fast on the shaft 36 and the housing or stator 67 is secured to the carriage. The torque applied thereby to shaft 36 exerts stress through the wheel 35 to the slide 42, tending to move the latter endwise and normally holding it against one or the other of the abutments 51 or 52. Other equivalent means may be coupled with the shaft, or otherwise connected with the slide, to apply force alternately in opposite directions in time with the movements of the carriage. In general, reversals of such force-applying means are timed to take place simultaneously, or nearly so, with reversals of the carriage, and to cause continual application of force in one direction during substantially the entire course of the carriage in one direction. The provision of separate motive means for the carriage and the shaft 36 or slide 42 enables the slide to be held with pressure against either abutment while the carriage travels in either direction. For instance, the slide may be held against the abutment 51 while the carriage makes its advancing stroke and against the abutment 52 while the carriage returns, or vice versa. The force exerted by its separate motor on the shaft 36 and slide 42 is substantially less than the force exerted by the carriage-reciprocating motor 34.

whereby it may be applied in opposition to the driving motor without sensibly impeding the travel of the carriage. Only such force need be applied by the motor 66, 67 or its equivalent as will hold the slide continuously against one abutment or the other and, when the direction of torque application is the same as that of the rotary component, will rotate the spindle as fast as the travel of the carriage permits.

The modified construction shown in Figures 5 and 6 differs from that last described in that a gear wheel 35a is substituted for the smooth surfaced wheel or roll 35 and a rack 40a is substituted for the tapes. This rack is secured by bolts 68 to a slide 42a like slide 42. In other respects the construction of Figures 5 and 6 is identical with that of Figures 2, 3 and 4 and is actuated by force-applying means like the motor 66—67 or an equivalent. The intermeshing teeth of the gear wheel and rack cause the wheel to roll without slip on the slide 42a while the latter stands stationary during travel of the carriage.

Some of the effects produced by the slide, wheel and torque motor are illustrated diagrammatically in Figures 7 to 10, which show these parts in the same relation to the work spindle as represented in Figure 1. In Figure 7 it is assumed that the carriage is traveling from right to left, as indicated by the arrow A, and that the torque motor exerts force on the wheel 35 counterclockwise as indicated by the arrow B. The slide 42 is then pressed against the abutment 52. As the carriage proceeds, the wheel rolls without slip on the slide, causing the workpiece to turn counterclockwise about its axis as indicated by the arrow C. A tooth t of the work is thereby caused to bear on the left-hand grinding wheel face 18 and is rolled on said face as on a rack tooth; the work gear tooth t' which is adjacent to the right-hand grinding wheel face 19 being withdrawn from that face. On reversal of the carriage and torque motor, the condition shown in Figure 8 occurs, torque being applied clockwise to the wheel 35 and work piece, and tangential force toward the left to the slide 42, bringing the slide against abutment 51 and the gear tooth t' into bearing with the grinding wheel face 19. Movement of the carriage to the right, with continued clockwise rotation of the wheel 35, causes tooth t' to be ground; the tooth t being then withdrawn from wheel face 18. After all of the teeth have been thus ground, the abutments are withdrawn or backed off by distances having the correct ratio to the required depth of cut, in consequence of which an increment of angular movement is given to the wheel and workpiece, additional to the angular component of rolling movement, whereby more stock is removed from the surfaces of the workpiece. As many of such increments of movement are imparted as the number of cuts required to be taken in bringing the work to finished dimensions, and the extent of each increment is that prescribed for the depth of the next ensuing cut.

When the relationship of translation and rotation is as indicated by the arrows in Figures 7 and 8, the progress of grinding action is from the root to the tip of each gear tooth; that is, in the root to tip direction of the curve being ground. This fact is further illustrated in Figure 9 with respect to the tooth t'. This figure shows by full lines the position of the tooth at commencement of the grinding action. The center of the gear is then in the position a and the grinding wheel is in contact with the root of the tooth at point b. At the conclusion of grinding, the position then occupied by the tooth being shown by broken lines, the center of the work has moved to the position a' and the extremity of the tooth is in contact with the wheel at b'. Similar but reversed action is performed on the tooth t by the grinding wheel face 18 while the work center is shifted from approximately the point a2 to the point a3 and the work is turned in counter-clockwise rotation.

But the teeth may be ground in the tip to root direction by reversing the direction of force applied by the motor 66—67 relatively to the direction of carriage travel. Thus, by causing this motor to exert clockwise torque to the wheel 35 and workpiece, as indicated by the arrow D in Figure 10, while the work is traveling in the direction of arrow A, the slide 42 is brought against the abutment 51 and the tooth t' is brought at its tip against the wheel face 19 shortly after commencement of the carriage travel from right to left as indicated in full line position in Figure 10, and is then rolled until points at or near its root are brought against the wheel at the rim of the latter. Tooth t is ground in the tip to root direction by applying counter-clockwise torque while traveling in the direction of arrow A' (Fig. 8). The reversing of the motor 66—67, or its equivalent, enables the direction of force application to the rotation controlling means to be reversed independently of the direction of carriage travel. The last preceding explanation applies equally to the construction involving tapes and that including a gear and rack. Both the tape wheel and the gear wheel may be termed "rockers" which rock or roll on the slide.

Although the means here shown for adjusting the abutments consists of manually rotatable knobs, it is my intention to provide automatic means for the purpose operated in timed sequence in the cycle of a completely automatic machine. Thus the adjusting means shown in Figures 26 to 29 inclusive of my prior application Serial No. 408,766 may be applied to the abutments, with substitution of gears for the knobs 53 to operate them independently or in unison. Furthermore, the means for operating and timing the motors here shown and for indexing the work may be the same as the means for those purposes shown in my said prior application.

It is not essential that the wheel 35 or 35a be associated with the work spindle in the specific manner here shown, as it may be mounted directly on the work spindle, or operatively connected or coupled thereto in other ways apparent to persons skilled in this art.

What I claim and desire to secure by Letters Patent is:

1. A machine for finishing gears and the curved faces of machine elements similar or analogous to gear teeth, comprising a supporting structure, a rotatable work spindle, a rotatable cutting tool adapted to generate and cut a curved surface on a workpiece carried by said spindle, in consequence of relative rolling movements in opposite directions between said tool and work spindle, an angularly movable wheel in torque-transmitting connection with the spindle, a slide mounted with capacity for reciprocating movement on the supporting structure in non-slip rolling connection with the wheel, abutments mounted on the supporting structure flanking the slide across the path of movement thereof, and being adjustable to establish variable limits to such path, and means for effecting relative translative displacement alternately in opposite directions transverse to the axis of rotation of the spindle between the spindle and slide on the one hand and the cutting tool and abutments on the other hand.

2. A machine for finishing gears and the curved faces of machine elements similar or analogous to gear teeth, comprising a supporting structure, a carriage mounted to reciprocate on said structure, a work spindle and a rocker supported rotatably on the carriage and coupled together for transmission of angular movement from one to the other, a slide separate from the carriage mounted reciprocably on the supporting structure having a portion with which the rocker is in non-slip motion-transmitting engagement, abutments mounted on the supporting structure flanking said slide in position to be engaged by one or the other of the adjacent extremities of the slide, means for reciprocating the carriage in a path such that the slide is enabled to bear on the abutments alternately with travel of the carriage in opposite directions, means for shifting the abutments toward and away from each other, means for applying force alternately in opposite directions to the rocker and slide in time with the reciprocations of the carriage, and a cutting tool located and operable to perform a cutting action on a face of a workpiece connected with the spindle.

3. In a machine of the character and for the purposes set forth, a supporting structure, a carriage mounted to reciprocate on said supporting structure, a work spindle mounted rotatably on the carriage with its axis transverse to the path in which the carriage reciprocates, a rocker coupled with the spindle, a slide separate from the carriage mounted to reciprocate on the supporting structure in a path substantially parallel with the path of the carriage and being in non-slip rolling connection with the rocker, an abutment mounted on the supporting structure in position to be engaged by said slide, motive means acting on the carriage to move it back and forth, and other motive means acting on the rocker and slide independently of the carriage-motive means to maintain contact of the slide with the abutment during travel of the carriage in one direction.

4. In a machine of the character and for the purposes set forth, a supporting structure, a carriage mounted to reciprocate on said supporting structure, a work spindle mounted rotatably on the carriage with its axis transverse to the path in which the carriage reciprocates, a rocker coupled with the spindle, a slide separate from the carriage mounted to reciprocate on the supporting structure in a path substantially parallel with the path of the carriage and being in non-slip rolling connection with the rocker, an abutment mounted on the supporting structure in position to be engaged by said slide, motive means acting on the carriage to move it back and forth, other motive means acting on the rocker and slide independently of the carriage-motive means to maintain contact of the slide with the abutment during travel of the carriage in one direction whereby progressive rolling movement is imparted to the spindle and a work piece thereon, and a cutting tool disposed to perform a generative cutting action on such a work piece in consequence of such rolling movement thereof, the second-named motive means being reversible to effect such engagement during the travel of the carriage in either direction, whereby to effect progression of cutting action on the workpiece either from the inner toward the outer portion thereof or from the outer toward the inner portion thereof.

5. In a machine of the character and for the purposes set forth, a supporting structure, a carriage mounted to reciprocate on said supporting structure, a work spindle mounted rotatably on said carriage with its axis transverse to the path of reciprocation thereof, a slide on the supporting structure arranged to move in a path substantially parallel to the path of the carriage, a rocker coupled with the spindle and arranged to turn about an axis transverse to the path of the carriage, having non-slip rolling engagement with the slide in directions parallel to the path of the carriage, abutments mounted on the supporting structure in positions to be engaged by the slide in consequence of movement thereof relative to the carriage in opposite directions, motive means coupled with the carriage for moving it back and forth, other motive means connected to apply torque to the rocker and tangential force to the slide relatively to the carriage, said last-named means being reversible to cause engagement of the slide with one of the abutments during travel of the carriage in one direction and with the other abutment during travel of the carriage in the opposite direction, and means for shifting the abutments whereby to permit increments of angular feeding movement to be imparted to the spindle in addition to the rotary component of rolling movement imparted to the spindle by the rocker while the slide is engaged with either abutment.

6. In a machine of the character and for the purposes set forth, a supporting structure, a carriage mounted to reciprocate on said supporting structure, a work spindle mounted rotatably on said carriage with its axis transverse to the path of the carriage, a slide on the supporting structure arranged to move in a path substantially parallel to the path of the carriage, a rocker coupled with the spindle having non-slip rolling engagement with the slide in directions parallel to the path of the carriage, an abutment mounted on the supporting structure in position to be engaged by a portion of the slide to limit movement of the slide in one direction, motive means coupled with the carriage for moving it back and forth, independent motive means coupled with the rocker and slide for exerting force thereon to hold the slide against the abutment, and means for shifting the abutment to permit displacement of the slide and cause an increment of angular feeding movement to be imparted to the slide in addition to the rotary movement consequent upon rolling of the rocker on the slide during travel of the carriage.

7. In a machine of the character and for the purposes set forth, a supporting structure, a carriage mounted to reciprocate on said supporting structure, a work spindle mounted rotatably on said carriage to turn about an axis transverse to the path of the carriage, a slide on the supporting structure arranged to move in a path substantially parallel to the path of the carriage, a rocker coupled with the spindle having non-slip rolling engagement with the slide in directions parallel to the path of the carriage, an abutment mounted on the supporting structure in position to be engaged by a portion of the slide to limit movement of the slide in one direction, motive means coupled with the carriage for moving it back and forth, independent motive means coupled with the rocker and slide for exerting force thereon to hold the slide against the abutment, and means for shifting the abutment to permit displacement of the slide and cause an increment of angular feeding movement to be imparted to the slide in addition to the rotary movement consequent upon rolling of the rocker on the slide during travel of the carriage, the second-named motive means being reversible in time with the reversals of the carriage to maintain the slide in contact with the abutment during travel of the carriage in both directions.

8. In a machine as and for the purposes set forth, a supporting structure, a carriage mounted to reciprocate in a prescribed path on said supporting structure, a slide mounted on the supporting structure and being reciprocable in a path substantially parallel to that of the carriage, abutments mounted adjustably on the supporting structure in position to obstruct the slide and establish limits to the path of movement thereof and being adjustable to alter such limits, a work holder mounted rotatably on the carriage with its axis of rotation transverse to the path of the carriage, a wheel or roll coupled to said work holder arranged in peripheral rolling relation to the slide, and tapes passing oppositely around the wheel and between the circumference thereof and the slide, and being secured to the slide at points on respectively opposite sides of a line perpendicular to the slide passing through the center of the wheel.

9. In a machine as and for the purposes set forth, a supporting structure, a carriage mounted to reciprocate in a prescribed path on said supporting structure, a slide mounted on the supporting structure and being reciprocable in a path substantially parallel to that of the carriage, abutments mounted adjustably on the supporting structure in position to obstruct the slide and establish limits to the path of movement thereof and being adjustable to alter such limits, a work holder mounted rotatably on the carriage with its axis of rotation transverse to the path of the carriage, a wheel or roll coupled to said work holder arranged in peripheral rolling relation to the slide, and two tapes secured to the slide at points distant from each other on a line extending in the direction of movement of the slide, said tapes passing in relatively opposite directions from their points of attachment between the slide and the wheel and around the circumference of the wheel to points of attachment therewith.

10. In a machine as and for the purposes set forth, a supporting structure, a carriage mounted to reciprocate in a prescribed path on said supporting structure, a slide mounted on the supporting structure and being reciprocable in a path substantially parallel to that of the carriage, abutments mounted adjustably on the supporting structure in position to obstruct the slide and establish limits to the path of movement thereof and being adjustable to alter such limits, a work holder mounted rotatably on the carriage with its axis of rotation transverse to the path of the carriage, a gear coupled to the work holder, and a rack secured to the slide in meshing engagement with said gear.

11. A machine for generating and cutting the curved faces of gear teeth and similar elements, comprising a supporting structure, a grinding wheel mounted on said supporting structure and having a lateral active face, a carriage on the supporting structure arranged to reciprocate in a path transverse to said active face, a work holder rotatably mounted on the carriage adapted to hold and rotate a workpiece in such manner that a surface of the workpiece is caused to roll on the active face of the grinding wheel during travel of the carriage, and means for rotating, and controlling the rotation of, said work holder comprising a gear wheel coupled with the work holder, a slide mounted on the supporting structure with provisions for movement thereon in a path parallel to the carriage path, rack teeth on the slide extending in a line parallel to the path thereof meshing with the teeth of said gear, an abutment adjacent to said slide in the path of movement of a portion thereof, reversible motive means coupled with the carriage for moving it back and forth in its appointed path, and reversible force-applying means coupled with said gear and slide for causing the slide to bear against said abutment during travel of the carriage in one direction.

12. A machine for finishing gears and the curved faces of machine elements similar or analogous to gear teeth, comprising a supporting structure, a carriage mounted to reciprocate on said structure, a work spindle and a rocker supported rotatably on the carriage with their axes of rotation transverse to the path in which the carriage reciprocates and coupled together for transmission of angular movement from one to the other, a slide mounted on the supporting structure for movement in a path parallel to that of the carriage with which the rocker is in non-slip motion-transmitting engagement, abutments mounted on the supporting structure independently of the carriage in position to limit motion of the slide relatively to the carriage in opposite directions, means for reciprocating the carriage in its path, whereby the slide, engaging the abutments alternately with travel of the carriage in opposite directions, causes the work spindle to turn about its axis, means for shifting the abutments toward and away from each other, and a cutting tool arranged to perform a cutting action on a face of a work piece secured to the spindle.

EDWARD W. MILLER.